United States Patent [19]
Girard et al.

[11] Patent Number: 5,391,111
[45] Date of Patent: Feb. 21, 1995

[54] METHOD AND APPARATUS FOR ELIMINATING SUDDEN CHANGES OF PRESSURE INSIDE VEHICLES, IN PARTICULAR GROUND VEHICLES

[75] Inventors: Hervé Girard, La Rochelle; Jean-Laurent Peube; Yves Gervais, both of Poitiers, all of France

[73] Assignee: GEC Alsthom Transport SA, Paris, France

[21] Appl. No.: 91,987

[22] Filed: Jul. 16, 1993

[30] Foreign Application Priority Data

Jul. 16, 1992 [FR] France ................. 92 08798

[51] Int. Cl.⁶ ........................................... B61D 27/00
[52] U.S. Cl. ..................... 454/70; 454/103; 454/105
[58] Field of Search ............ 454/75, 99, 103, 105, 454/70

[56] References Cited

U.S. PATENT DOCUMENTS

| 370,667 | 9/1987 | Wands ................. 454/103 |
| 3,563,155 | 2/1971 | Ishizawa ............... 454/105 |
| 5,137,490 | 8/1992 | Ishikawa et al. ........ 454/105 X |

FOREIGN PATENT DOCUMENTS

| 0143931 | 6/1985 | European Pat. Off. . |
| 0315108 | 5/1989 | European Pat. Off. . |
| 0326044 | 8/1989 | European Pat. Off. . |
| 3603802 | 8/1987 | Japan ................. 454/103 |

*Primary Examiner*—Harold Joyce
*Attorney, Agent, or Firm*—Sughrue, Mion, Zinn, Macpeak & Seas

[57] ABSTRACT

The invention relates to a device for eliminating sudden changes of pressure in a ventilated or air-conditioned vehicle, the device comprising: a detector for detecting changes in the pressure outside the vehicle and delivering signals representative of said changes; closure means for closing an outside air suction duct and an inside air rejection duct; a control unit receiving the signals from the detector and controlling closure of the ducts above a first determined rate of change in outside pressure, said unit also controlling re-opening of the ducts after said change in outside pressure has fallen below a second determined rate; and means for balancing the inside pressure and the outside pressure by a controlled flow of air between the outside and the inside of the vehicle, said means constraining the pressure inside the vehicle to change as a function of time at less than a set rate.

6 Claims, 2 Drawing Sheets

METHOD AND APPARATUS FOR ELIMINATING SUDDEN CHANGES OF PRESSURE INSIDE VEHICLES, IN PARTICULAR GROUND VEHICLES

The invention relates to a method and apparatus for eliminating sudden changes of pressure inside vehicles, in particular ground vehicles. It is particularly applicable to high speed trains.

BACKGROUND OF THE INVENTION

A vehicle moving through the atmosphere is subjected to pressure forces distributed against the outside wall of the vehicle in a manner that depends on the shape of the vehicle and on its speed of travel. When the vehicle passes close to an obstacle (a tunnel mouth, a bridge, various objects in the vicinity of the track, . . .) or when it crosses another vehicle, the field of aerodynamic speeds entrained with the vehicle is deformed. As a result there are sudden changes in pressure on the outside walls of the vehicle. This effect becomes more marked with increasing vehicle speed, since the pressures involved are approximately proportional to the square of the speed.

For a vehicle in which inside air is renewed by air-conditioning or ventilation taken from outside air, the pressure inside the vehicle is close to the pressure outside the vehicle. Changes in outside pressure are transmitted almost instantaneously to the inside of the vehicle given the sectional dimensions of the ventilation circuits. It is observed that the time required for pressure changes to be transmitted to the inside of air-conditioned or ventilated vehicles is thus small, specifically because of the characteristics of the ventilation circuits. This rapid phenomenon does not occur when the inside of the vehicle is pressurized (e.g. in aircraft).

By way of example, when a high speed train enters a tunnel or a cutting, rapid changes in pressure occur on the outside walls of the coaches (or "cars"). These sudden changes propagate into the confined space constituted by the tunnel or the cutting and are known by the term "pressure waves". In addition, such pressure waves which propagate in the outside confined space are reflected from the ends thereof, thereby creating reflected pressure waves that are as large as the direct waves. When the coaches possess a fair degree of sealing, these changes travel quickly to the insides of the coaches via their ventilation and air-conditioning circuits, causing considerable discomfort to passengers. It is thus common to be subjected to rates of change in pressure that may be as great as 2,000 Pascals in less than 1 second.

To remedy this pressure wave problem, certain high speed trains use "steep front" fans placed in the ventilation circuit. These fans form, to some extent, an obstacle to pressure waves, but they have the drawback of being expensive and noisy. They constitute extra equipment of non-negligible weight and bulk in spite of the fact that major efforts are made to lighten coaches as much as possible. They consume large amounts of power. In addition, it is necessary to have two per coach.

OBJECTS AND SUMMARY OF THE INVENTION

To mitigate the above drawbacks, the present invention proposes subjecting the inside pressure of a ventilated or air-conditioned vehicle to a rate of change that is fixed a priori whenever a sudden change occurs in the outside pressure. To do this, a suitable device acts in real time to modify the geometrical characteristics of the air-conditioning or ventilation circuits quickly. These modifications are such that the resulting change in the flow rate of air entering the vehicle gives rise to a change in the pressure inside the vehicle that obeys a fixed time relationship. As soon as inside and outside pressures are in balance, the ventilation circuit is put back into condition to enable fresh air renewal to take place normally again. Such a device placed in the ventilation circuits is equivalent to transforming a circuit designed for renewing air by air-conditioning or ventilation very quickly into a circuit that controls the inside pressure of the vehicle (and vice versa), regardless of any sudden change that may occur in outside pressure (speed of the train, nature of the obstacle, topology of the surroundings . . . .).

The present invention thus provides a device for eliminating sudden changes of pressure in a ventilated or air-conditioned vehicle, the vehicle comprising:

an inlet orifice for outside air and an outlet orifice for inside air, the inlet orifice being connected to a suction duct directing sucked-in air towards the ventilation or air-conditioning system, the outlet orifice being connected to a rejection duct rejecting inside air to the outside;

a detector for detecting the pressure wave of the vehicle and for delivering signals representative of said pressure wave;

closure means for closing the suction duct and the rejection duct; and a control unit that receives the signals from the detector;

wherein:

the detector detects variations in the outside or the inside pressure of the vehicle as a function of time;

the control unit controls closure of the ducts on the basis of a first determined rate of change in inside or outside pressure as a function of time, said unit also controlling re-opening of the ducts after the rate of change in inside or outside pressure as a function of time has dropped below a second determined rate; and wherein:

means are provided for balancing the inside and outside pressures by causing a controlled flow of air between the outside and the inside of the vehicle in such a manner as to keep change in the pressure inside the vehicle as a function of time below a set value, said means including a branch connection.

The detector for detecting variations in pressure as a function of time may be a pressure sensor or an instantaneous flow rate sensor.

Advantageously, the closure means are constituted by flaps situated inside the suction duct and the rejection duct. This makes it possible for them to be implemented simply.

Each flap may be rotatable about the axis of a shaft secured to the flap and controlled by an actuator.

The means for balancing the .inside and outside pressures may comprise the leaks of the vehicle.

They may comprise closing the suction duct and/or the rejection duct using the closure means.

They may also comprise a branch connection which is opened and closed under the control of the control member. In which case, common closure means may control alternate opening and closing of one of the ducts and of the branch connection.

The device may also be modified to control the normal air-conditioning flow rate by causing the closure means for the suction and rejection ducts to act partially.

The invention also provides a method of eliminating sudden changes of pressure in a ventilated or air-conditioned vehicle, the method being having the following steps:

the pressure inside the vehicle is measured;
the pressure gradient as a function of time is calculated;
the suction duct and the rejection duct are closed when the absolute value of the pressure gradient as a function of time exceeds a threshold fixed by conditions of comfort;
the inside and outside pressures are brought into balance by a controlled flow of air between the outside and the inside of the vehicle so as to keep the change in the internal pressure of the vehicle as a function of time below a set value; and
the suction duct and the rejection duct are opened when the value of the gradient of the pressure inside the vehicle as a function is below said set value which corresponds to satisfactory conditions of comfort.

BRIEF DESCRIPTION OF THE DRAWINGS

The invention will be better understood and other details and features will appear on reading the following description given by way of non-limiting example and made with reference to the accompanying drawings, in which.

MORE DETAILED DESCRIPTION

Figure 1:
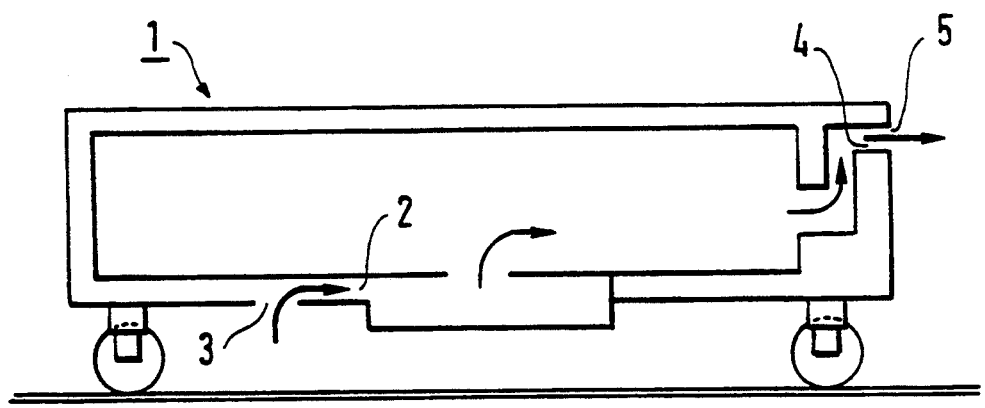
FIG. 1 is a diagrammatic view of a rail vehicle showing the air inlet and outlet ducts for air-conditioning or ventilating the vehicle.

FIG. 1 is a diagram showing the general ventilation circuit for a coach 1 of a high speed train. The coach includes a duct 2 for sucking in outside air, which duct extends between an inlet orifice 3 and the internal ventilation circuit; and it also includes a duct 4 for rejecting inside air and disposed between the internal ventilation circuit and an air outlet orifice 5. The various elements of the internal ventilation circuit (partial recirculation of the air, heating or air-conditioning means, fans, etc.) have no particular influence on the operation of the device of the invention.

When the coach passes through a region of sudden pressure change, a relatively large volume of air (of the order of 1 m³ to 2 m³) suddenly enters or leaves the coach via the ducts 2 and 4. This sudden change in the mass of air contained in the coach is directly related to the change in pressure, and according to the invention this can be controlled by placing shutter elements in the ducts 2 and 4.

The device of the invention performs the following operations. When a pressure wave occurs, it is detected by one of its instantaneous effects (a sudden change in pressure or in an instantaneous flow rate, for example) by means of a conventional type of detector. The phenomenon may be anticipated by performing detection at one or more points along the train, inside it or outside it.

As soon as a pressure wave has been detected, the shutter elements immediately shut the ducts 2 and 4 completely or nearly completely. The rate of air flow due to the pressure wave is then controlled by a leakage orifice. This leakage orifice may be constituted by an orifice whose dimensions are calibrated a priori. It may alternatively be constituted by an orifice whose dimensions can be modulated as a function of an imposed rate of change in internal pressure. The calibrated dimension orifice may optionally be constituted, in part, by leaks of the vehicle. The flow of air interchanged between the inside and the outside of the vehicle is thus constrained to take place over a length of time that is long enough to ensure that changes in pressure (positive or negative) do not cause discomfort to the passengers in the vehicle.

Pressure wave control is interrupted as soon as the inside and outside pressures are in equilibrium. The ducts 2 and 4 are then re-opened. The ventilation system of the vehicle returns to normal operation in which it extracts used air and replaces it with new air.

Figure 2:
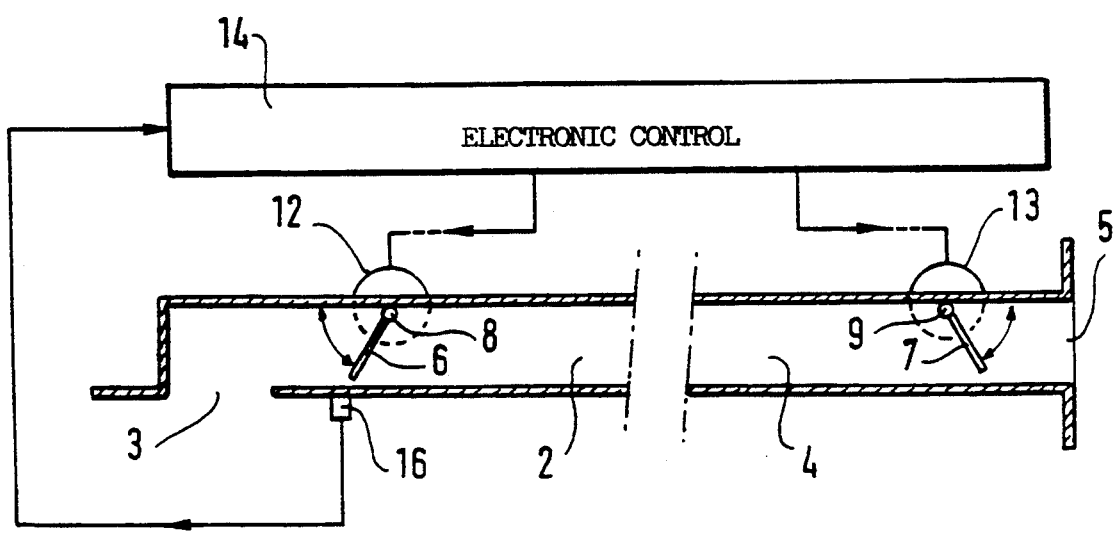
FIG. 2 is a diagram explaining the operation of the device of the invention.

FIG. 2 shows how the device operates in a particular embodiment. The shutter elements are constituted in this case by flaps: a flap 6 disposed in the suction duct 2 and a flap 7 disposed in the rejection duct 4. The pressure variation detector 16 (e.g. a pressure sensor or an instantaneous flow rate sensor) is disposed beneath the vehicle. One or more sensors may be used, detecting pressure variations by any one of their effects.

Thus, if pressure increases, it is possible, depending on the type of sensor, to detect the outside pressure increase itself, the beginning of an increase in inside pressure (using a sensor placed inside a vehicle), the very large increase in the instantaneous flow rate in the inlet 3 to the duct 2, or the reversal of the air flow direction in the outlet 5 of the duct 4.

Figure 3:
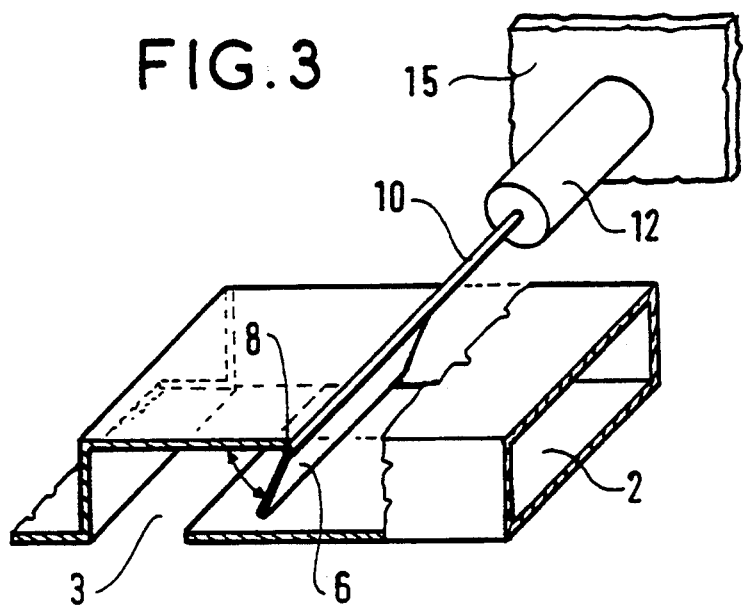
FIGS. 3 and 4 show the system for closing the air inlet and outlet ducts in the device of the invention.
Figure 4:
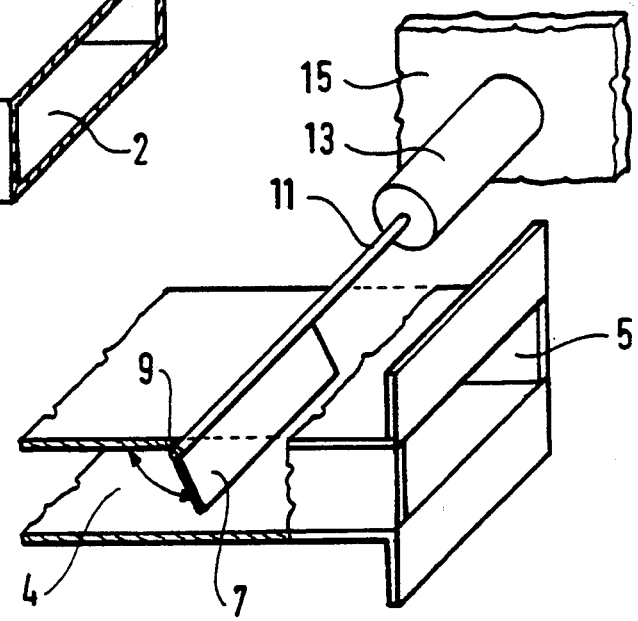

The dimensions of the flaps 6 and 7 match those of the ducts 2 and 4. They are disposed in the vicinity of the inlet 3 and of the outlet 5. They are rotatable on shafts 10 and 11 secured to them along one of their sides and co-operating with a hinge system 8 or 9 associated with the walls of the ducts 2 or 4 (see FIGS. 3 and 4). The shafts are rotated by respective actuators 12 and 13 fixed to the load-bearing structure 15 of the vehicle. The actuators may be pneumatic, hydraulic, or electro-mechanical.

An electronic system 14 processes signals delivered by the sensor(s) 16 and Generates control signals for the actuators 12 and 13. The electronic system 14 may be of the type described in Document FR 2 613 089. It may be integrated in the general control system of the train. As soon as the pressure wave detector(s) has/have detected a pressure wave that is taken as being too large, the electronic system 14 instantaneously Generates command signals causing the actuators to close the flaps. The flaps may be closed very quickly, e.g. in one-tenth of a second. They are preferably made of a material having little inertia, e.g. aluminum or a composite material.

Simultaneously with closure of the flaps, the electronic system 14 also controls stopping of the ventilation or air-conditioning devices. They are put back into operation, still under the control of the electronic system, when the flaps are re-opened.

As soon as the pressure wave detector no longer detects pressure changes that would be unacceptable for the passengers, the electronic system 14 causes the flaps to re-open progressively. The time taken to re-open the flaps is a function of the desired degree of comfort. It may be determined by experiment. It may also be determined by the electronic system as a function of certain parameters such as the amplitude of the change in outside pressure, the duration of the change, etc. The ducts are thus re-opened once the outside pressure change has dropped beneath a level that may be set by experiment or by calculation. Given that the instantaneous air flow rate that results from a sudden change in outside pressure is much greater than the usual ventilation flow rate, the flaps need not be in operation when away from zones in which pressure changes suddenly. In the absence of pressure waves, they may be fully retracted so as to avoid disturbing normal operation of the ventilation system.

As mentioned above, the leakage that allows inside and outside pressures come back into balance is controlled by a leakage orifice that may be constituted in part by the air leaks of the vehicle.

The leakage orifice may include various other portions. The flaps may close the ducts in part only so as to allow a certain amount of air flow to pass. They may close the ducts completely while being provided with respective holes of diameter that is determined by calculation or by experiment.

The device of the invention does not control the air-conditioning or ventilation air flow rate directly. Nevertheless, it may be used for controlling the normal air-conditioning flow rate and for making several different air-conditioning configurations available, e.g. when the outside temperature is very high or very low. Several types of modification are possible.

The normal position of the flaps may be a partially open position so as to reduce the nominal ventilation flow rate.

The air flow rate can then be controlled by continuously controlling flap position, providing the performance of the actuators is suitable for obtaining effective control in all possible flap positions. Flap position is then the result of regulation performed on the basis of measuring ventilation flow rate, e.g. by means of a flow meter.

Figure 5:
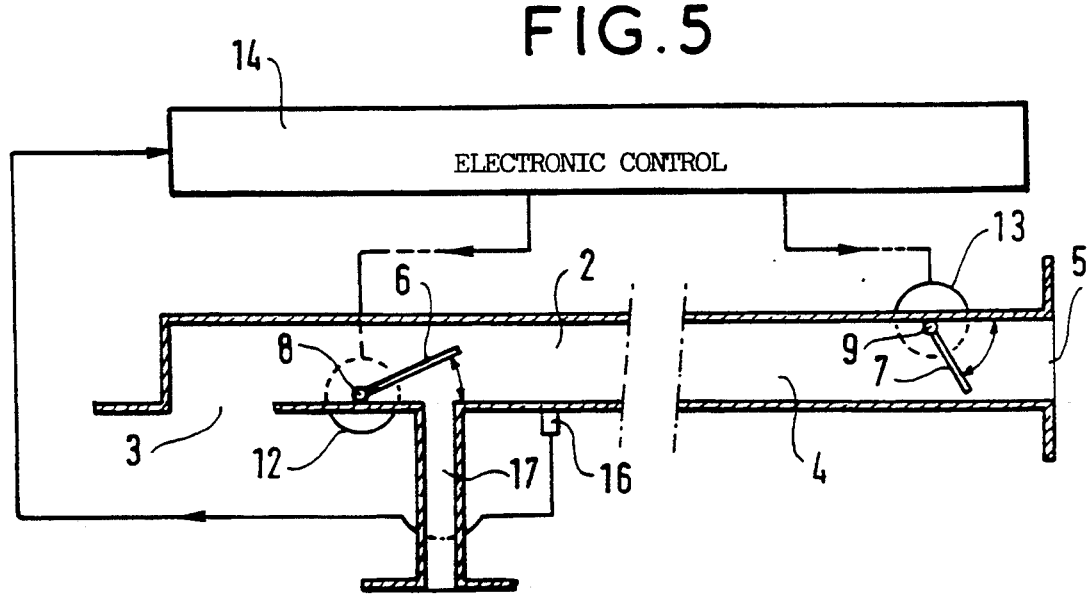
FIG. 5 is a diagram of a variant device of the invention.

Inside and outside pressures may also be brought into balance by means of the device shown in FIG. 5. In this variant, a branch connection 17 is provided on the suction duct 2. However, this branch connection could be connected to any point of the ventilation circuit lying between the flaps 6 and 7. In the absence of pressure waves, this branch connection is normally closed.

The device of FIG. 5 operates as follows. As soon as the detector 16 reveals the presence of a pressure wave, the ducts 2 and 4 are closed while the branch connection 17 is opened. One of the main ventilation circuits may be closed and the branch circuit may be opened by means of two independent mechanisms, or alternatively a single mechanism may be used as shown in FIG. 5 where the flap 6 is capable simultaneously of closing one and opening the other. The branch connection 17 controls the flow of air due to the pressure wave and is additional to the leaks of the vehicle. The dimensions of the branch connection 17 may be prior defined. The branch connection may alternatively possess a throat of dimensions that can be modulated as a function of the set relationship for pressure change as a function of time.

As soon as pressure balance is deemed to have been achieved, the ducts 2 and 4 are re-opened and the branch connection 17 is closed. The ventilation system returns to normal operation.

The device of the invention also has the advantage of consuming very little power.

We claim:

1. A device for eliminating sudden changes of pressure in a ventilated or air-conditioned vehicle the vehicle comprising:

an inlet orifice for outside air and an outlet orifice for inside the inlet orifice being connected to a suction duct directing sucked-in air towards the ventilation or air-conditioning system, the outlet orifice being connected to an exhaust duct exhausting inside air to the outside;

a detector for detecting the pressure wave the vehicle and for delivering Signals representative of said pressure wave;

closure means for closing the suction duct and the exhaust duct; and a control Unit that receives the signals from the detector;

wherein:

the detector detects variations in the outside or the inside pressure of the vehicle as a function of time;

the control unit controls closure of the ducts on the basis of a first determined rate of change in inside or outside pressure as a function of time, said unit also controlling re-opening of the ducts after the rate of change in inside or outside pressure as a function of time has dropped below a second determined rate;

wherein:

balancing means are provided for balancing the inside and outside pressures by causing a controlled flow of air between the outside and the inside of the vehicle in such a manner as to keep change in the pressure inside the vehicle as a function Of time below a set value, said balancing means comprising a branch connection;

wherein the means for balancing the inside and outside pressures further comprise leaks of the vehicle; and wherein said balancing means include said closure means which partially closes one or both of the suction duct and the exhaust duct.

2. A device for eliminating sudden changes of pressure in a ventilated or air-conditioned vehicle, the vehicle comprising;

an inlet orifice for outside air and an outlet orifice for inside air the inlet orifice being connected to a suction duct directing sucked-in air toward the ventilation or air-conditioning system, the outlet orifice being connected to an exhaust duct exhausting inside air to the outside;

a detector for detecting the pressure wave of the vehicle and for delivering signals representative of said pressure wave;

closure means for closing the suction duct and the exhaust duct; and a control unit that receives the signals from the detector;

wherein:

the detector detects variations in the outside or the inside pressure of the vehicle as a function of time;

the control unit controls closure of the ducts on the basis of a first determined rate of change in inside or outside pressure as a function of the, said unit also controlling re-opening of the ducts after the rate of change in inside or outside pressure as a function of time has dropped below a second determined rate;

wherein:

balancing means are provided for balancing the inside and outside pressures by causing a controlled flow of air between the outside and the inside of the vehicle in such a manner as to keep change in the pressure inside the vehicle as a function of time below a set value, said balancing means comprising a branch connection in communication with one of said ducts closure means for closing said branch connection; and the control unit controls opening of the branch connection upon the closure of the ducts.

3. A device according to claim 2, wherein said closure means comprise common closure means which control opening and closing of one of said ducts and of the branch connection in alternation.

4. A device according to claim 2, wherein the detector for detecting variations in pressure as a function of time is a pressure sensor or an instantaneous flow rate sensor.

5. A device according to claim 2, wherein the closure means are constituted by flaps situated inside the suction duct and the exhaust duct.

6. A device according to claim 5, wherein each flap is rotatable about the axis of a shaft secured to the flap and controlled by an actuator.

* * * * *